(12) United States Patent
Chiesa et al.

(10) Patent No.: US 12,506,544 B2
(45) Date of Patent: Dec. 23, 2025

(54) ROUTING METHODS FOR QUANTUM COMMUNICATION PATHS ACROSS A MESH QUANTUM NETWORK

(71) Applicant: Cisco Technology, Inc., San Jose, CA (US)

(72) Inventors: Luca Della Chiesa, Cesenatico (IT); Louis Gwyn Samuel, Gloucestershire (GB); Paul Polakos, Marlboro, NJ (US); Scott Fluhrer, North Attleboro, MA (US); Santanu Ganguly, Ashford (GB)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 18/351,321

(22) Filed: Jul. 12, 2023

(65) Prior Publication Data

US 2023/0370169 A1 Nov. 16, 2023

Related U.S. Application Data

(63) Continuation of application No. 17/382,975, filed on Jul. 22, 2021, now Pat. No. 11,716,151.

(51) Int. Cl.
*H04B 10/70* (2013.01)
*H04B 10/27* (2013.01)

(52) U.S. Cl.
CPC ............ *H04B 10/70* (2013.01); *H04B 10/27* (2013.01)

(58) Field of Classification Search
None
See application file for complete search history.

(56) References Cited

U.S. PATENT DOCUMENTS

| 10,225,080 | B2 | 3/2019 | Drost et al. |
| 10,432,320 | B2 | 10/2019 | Gorshkov et al. |
| 2008/0258049 | A1 | 10/2008 | Kuzmich et al. |
| 2020/0204362 | A1* | 6/2020 | Li ............... H04L 9/0852 |
| 2021/0105135 | A1* | 4/2021 | Figueroa ......... H04B 10/70 |
| 2021/0119786 | A1* | 4/2021 | Bucklew ......... H04L 9/0852 |
| 2021/0175976 | A1* | 6/2021 | Rahman .......... H04L 9/0855 |

FOREIGN PATENT DOCUMENTS

| CN | 104754688 B | 9/2018 |
| CN | 109462548 A | 3/2019 |
| WO | 2021016095 A1 | 1/2021 |

\* cited by examiner

*Primary Examiner* — Darren E Wolf
(74) *Attorney, Agent, or Firm* — Polsinelli P.C.

(57) ABSTRACT

A method for routing in a quantum network is provided. The method may include receiving parameters including a fidelity with coherence decay time and an entanglement generation rate for each quantum node in a mesh quantum network by a controller, the controller being configured to communicate with each quantum node of a plurality of quantum nodes in the mesh quantum network. Each quantum node includes a quantum memory and a processor. The method may also include analyzing the fidelity with coherence decay time and the entanglement generation rate to yield a determination of a path fidelity with a path coherence decay time and a path entanglement generation rate between at least one pair of quantum nodes. The method may further include, based on the determination, selecting a quantum communication path from a source node to a destination node.

20 Claims, 12 Drawing Sheets

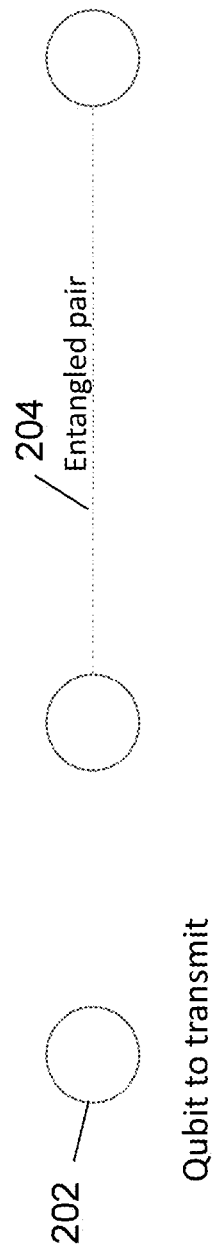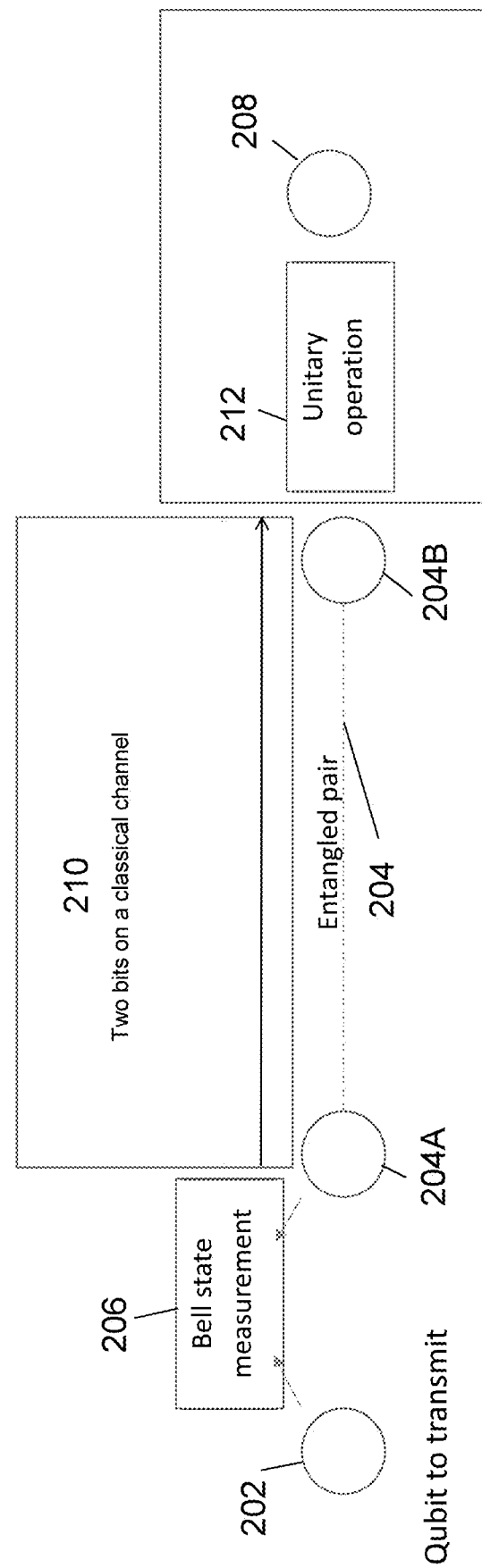

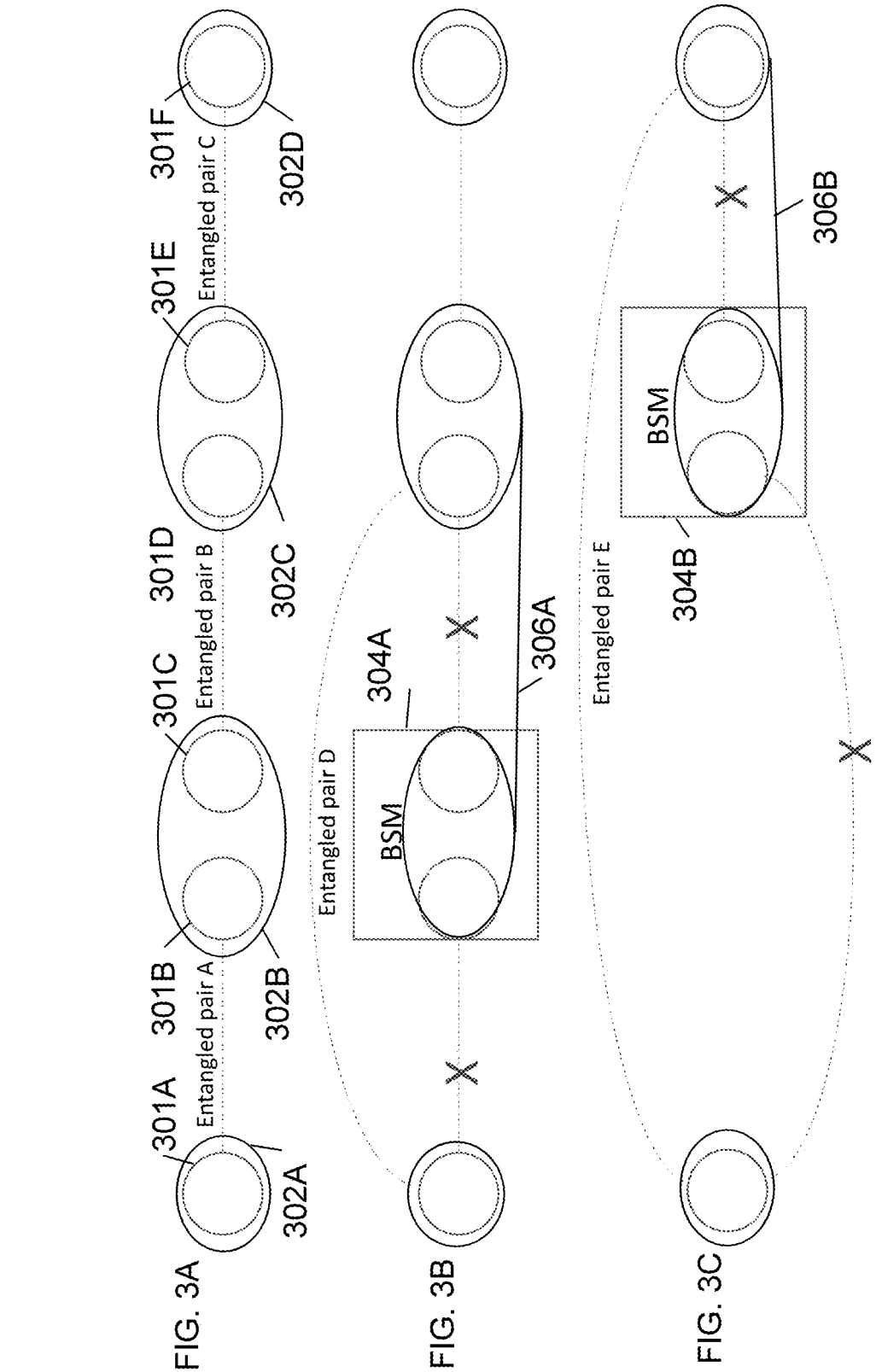

ROUTING METHODS FOR QUANTUM COMMUNICATION PATHS ACROSS A MESH QUANTUM NETWORK

CROSS-REFERENCE TO RELATED APPLICATION

This application is a continuation of U.S. patent application Ser. No. 17/382,975 filed on Jul. 22, 2021, the contents of which is incorporated by reference in its entirety.

FIELD

The disclosure is directed to routing methods or routing algorithms in quantum teleporting in a quantum network.

BACKGROUND

The development of quantum computing creates new requirements to implement a quantum network, which is also known as a quantum internet. The implementation for the quantum network is very different from that of a traditional classical network, because the quantum computing will require transfer of qubits. There are two models aimed for qubit transmission. One model is based on teleporting using quantum entangled Bell States, and another model permits direct transmission using quantum error correction. Teleporting is a technique for transferring quantum information from a sender at one location to a receiver at another remote location using a pair of entangled quantum particles. Both models are indeed technique to send the quantum information from the sender to the receiver. Both models assume the possible use of quantum repeaters to extend the distance between the sender and the receiver. The use of the models may depend on a total distance, a repeater distance, and the technology applied. It is well understood that in nodes where the repeater is implemented, a quantum channel can be routed or switched to a proper destination.

BRIEF SUMMARY

In one aspect, a method for routing in a quantum network is provided. The method may include receiving parameters including a fidelity with coherence decay time and an entanglement generation rate for each quantum node in a mesh quantum network by a controller, the controller being configured to communicate with each quantum node of a plurality of quantum nodes in the mesh quantum network, each quantum node including a quantum memory and a processor, for example, a classical processor. The method may also include analyzing the fidelity with coherence decay time and the entanglement generation rate to yield a determination of a path fidelity with a path coherence decay time and a path entanglement generation rate between at least one pair of quantum nodes. The method may further include, based on the determination, selecting, through the mesh quantum network, a quantum communication path from a first end point or a source node to a second end point or a destination node.

In another aspect, a controller may include one or more processors, and a non-transitory computer readable medium including instructions stored therein. The instructions, when executed by the one or more processors, cause the processors perform operations including receiving parameters including a fidelity with coherence decay time and an entanglement generation rate for each quantum node in a mesh quantum network, the controller being configured to communicate with each quantum node of a plurality of quantum nodes in the mesh quantum network, each quantum node including a quantum memory and a processor. The instructions, when executed by the one or more processors, also cause the processors perform operations including analyzing the fidelity with coherence decay time and the entanglement generation rate to yield a determination of a path fidelity with a path coherence decay time and a path entanglement generation rate between at least one pair of quantum nodes. The instructions, when executed by the one or more processors, also cause the processors perform operations including, based on the determination, selecting, through the mesh quantum network, a quantum communication path from a first end point or a source node to a second end point or a destination node.

In a further aspect, a non-transitory computer readable medium may include instructions. The instructions, when executed by a computing system, cause the computing system to perform operations including receiving parameters including a fidelity with coherence decay time and an entanglement generation rate for each quantum node in a mesh quantum network, the controller being configured to communicate with each quantum node of a plurality of quantum nodes in the mesh quantum network, each quantum node including a quantum memory and a processor. The instructions, when executed by the computing system, also cause the processors perform operations including analyzing the fidelity with coherence decay time and the entanglement generation rate to yield a determination of a path fidelity with a path coherence decay time and a path entanglement generation rate between at least one pair of quantum nodes. The instructions, when executed by the computing system, also cause the processors perform operations including, based on the determination, selecting, through the mesh quantum network, a quantum communication path from a first end point or a source node to a second end point or a destination node.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 2A illustrates a qubit to transmit and a two Bell state entangled pair of particles before teleporting, in accordance with some aspects of the disclosed technology;

FIG. 2B illustrates a bell state measurement (BSM) between the qubit to transmit and one of the two Bell state entangled pair, in accordance with some aspects of the disclosed technology;

FIG. 3A illustrates an entanglement swapping starting from multiple pairs of entangled particles, in accordance with some aspects of the disclosed technology;

FIG. 3B illustrates that the entanglement swapping is performed via a BSM on particles in the same node of two different entangled pair previously created, in accordance with some aspects of the disclosed technology;

FIG. 3C illustrates that teleporting can be achieved by multiple entanglement swapping to form an end-to-end entangled pair, in accordance with some aspects of the disclosed technology;

DETAILED DESCRIPTION

Figure 1A:
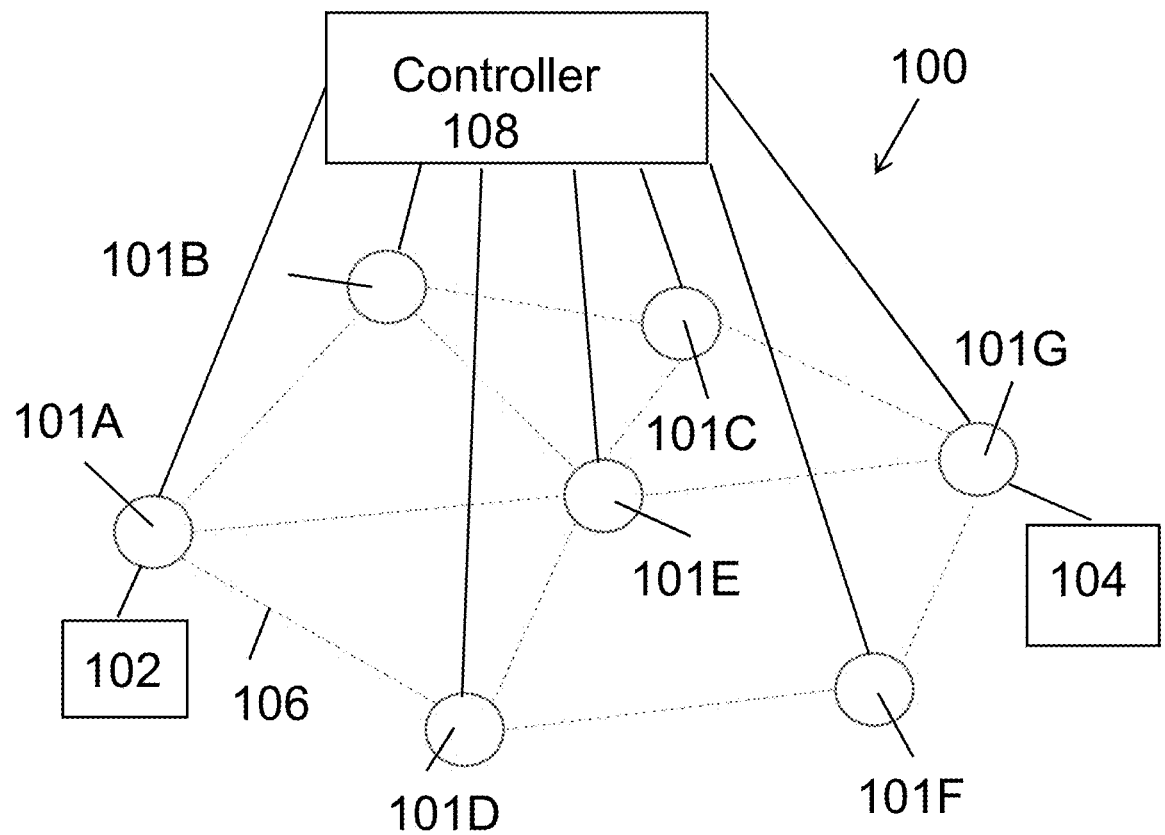
FIG. 1A is a network system diagram including a controller, in accordance with some aspects of the disclosed technology.

The disclosure may be understood by reference to the following detailed description, taken in conjunction with the drawings as described below. It is noted that, for purposes of illustrative clarity, certain elements in various drawings may not be drawn to scale.

Many routing protocols have been implemented in classical networking but none of the protocols have constrains like the ones of quantum networking technology. Efforts have been made on developing new quantum networking protocols. However, the efforts do not focus on how to resolve the path through the quantum network based on the specific constrains of the quantum networking technology.

In a mesh quantum network, such as the ones that may be implemented in a quantum data center, a quantum campus, or a quantum regional area network, a protocol is required such that quantum computers can ask for a quantum channel in order to communicate quantum information. The quantum network, also referred to as a quantum internet, is an interconnection of quantum processors and repeaters that can generate, exchange, and process quantum information. The quantum network facilitates the transmission of information in the form of quantum bits, also referred to as qubits, between physically separated quantum memories. The quantum channel is a physical media, such as optical fiber channel.

The quantum network might utilize a long distance quantum entanglement of entangled particles between two remote communication parties. The quantum network can provide security for communications between the two remote communication parties in that any attempt to hack the system would result in a collapse of the quantum state of a respective quantum entangled particle, thus revealing the attempt to hack into a communication. Applications of the quantum network can be implemented with many qubits representing quantum information.

To generate the long distance quantum entanglement between two end points or two parties through an optical fiber channel, e.g. Alice and Bob, one of the end points may create an entangled pair of photons and send one photon to the other end point. However, the optical fiber is lossy such that the success rate of establishing an entanglement pair decays exponentially with the physical distance between the two end points. To increase the success rate of long distance entanglement, a number of quantum repeaters can be deployed between the two end points or parties. The quantum repeaters work entirely different from classical network routers. To enable long distance entanglement, quantum repeaters use entanglement swapping. The purpose of entanglement swapping is to essentially position a pair of entangled quantum particles farther apart than might be possible, due to losses, by physical transmitting one of the quantum particles of the pair of quantum particles to a desired endpoint.

The disclosure is directed to routing methods and protocols that computers or classical computers select an appropriate path for the quantum channel across the mesh quantum network. Before a quantum information can be transmitted, each segment or quantum link between two neighboring nodes needs to have an entangled Bell State to offer in order to build the path via quantum entangled Bell States. The classical computer can trigger an appropriate entanglement swapping. The quantum network can become an important application that can boost quantum computing. The quantum network can rely on quantum regenerators that are based on quantum memories.

FIG. 1A is a network system diagram including a controller, in accordance with some aspects of the disclosed technology. As shown, a quantum communication network 100 includes nodes 101A to 101G. Each node is connected to at least one other node. In the network 100, communication takes place between a source node or an end node and a destination node or an end node. Intermediate nodes between the source node and the destination node act as repeater nodes. The end nodes are also referred to as end points.

In the quantum communication network, such as the one illustrated in FIG. 1A, communication between two nodes takes place through a channel 106. The channel 106 may be implemented in an optical fiber connection. The channels or links are shown as dash lines between nodes in FIG. 1A.

A controller 108 is in a communication with each node 101 of the network 100. The controller 108 may include one or more processors that are configured to execute a routing algorithm method for a quantum communication path across the network 100. For example, the controller 108 can evaluate parameters of each quantum node, e.g. a fidelity with coherence decay time and entanglement generation rate, and select a routing path through the network 100. More details will be provided later about the parameters and evaluations. The controller 108 may include a memory device. The routing algorithm includes instructions that can be stored in the memory device and executed by the processors.

The quantum communication path via teleporting requires the quantum network to establish an entanglement between two quantum memories through one or more quantum links.

A quantum channel connects two quantum devices or quantum processors and supports the transmission of qubits. If a quantum entanglement is successful, the link becomes a quantum link or the quantum channel, then the two quantum processors share a quantum entanglement pair. Each quantum https://en.wikipedia.org/wiki/Central_processing_unit processor is a small quantum computer being able to perform quantum logic gates on a certain number of qubits.

The quantum repeaters are used as relays to connect quantum processors. However, the quantum repeaters cannot be the source or destination of any qubit transmission, but can only perform quantum swapping across multiple repeaters, which is also referred to entanglement swapping. The quantum swapping establishes a long distance quantum entanglement. The quantum repeater generates an entanglement pair with Alice and simultaneously generates another entanglement pair with Bob. Entanglement swapping creates long distance entanglement that can be used for teleporting. Teleporting is performed after completing a BSM. Teleporting transfers the qubit or quantum information. In other words, the BSM is used for entanglement generation and entanglement swapping. Once the entangled particles are positioned at the source and destination nodes, the teleporting that transfers the qubit can occur independently of any link or path used in the process of positioning the entangled particles. The teleporting process destroys the entangled pair but transfers the qubit.

In some quantum nodes such as repeaters, there are no source or generators of particles. In other words, there are no transmitters in these quantum repeaters. The particles are transmitted to these quantum repeaters, such as photons through optical fiber channels.

For the long distance quantum swapping, all nodes on the quantum communication path need entangle different particle/memories with its predecessor and successor simultaneously.

Figure 1B:
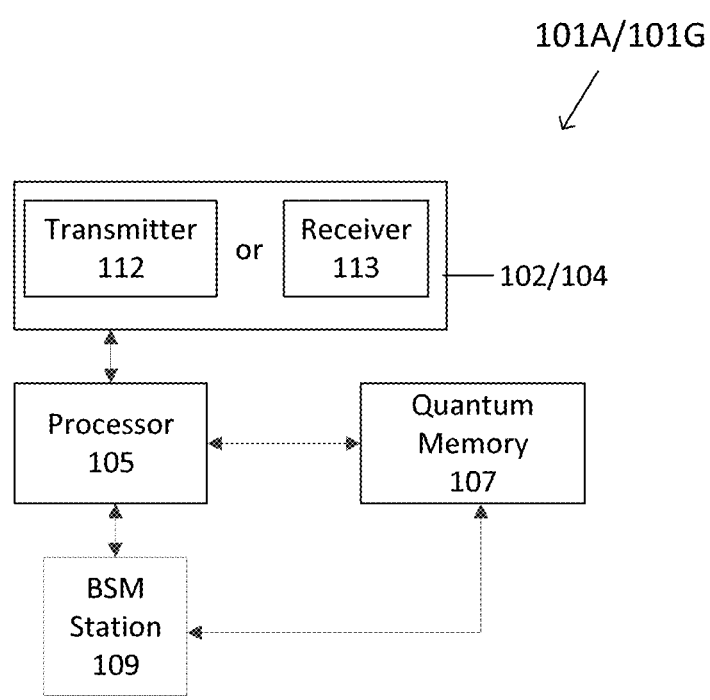
FIG. 1B is a diagram of the node of FIG. 1A, in accordance with some aspects of the disclosed technology.

FIG. 1B is a diagram of the source node 101A and/or destination node 101G of FIG. 1A, in accordance with some aspects of the disclosed technology. As shown in FIG. 1B, node 101A or 101G in the quantum communication network 100 may contain a processor 105 in a communication with the controller 108 to implement the routing protocol. The processor 105 may be a central processing unit (CPU), or graphical processing unit (GPU). The processor 105 is used for path selection and for controlling the quantum network. The processor 105 is a classical processor which is different from the quantum processor. The quantum processor is a small quantum computer being able to perform quantum logic gates on a certain number of qubits. The node 101A or 101G may also include a quantum memory 107 in a communication with the processor 105.

The node 101A or 101G may also include a quantum communication unit 103 in a communication with the processor 105. The quantum communication unit 103 may include a quantum transmitter 111 and/or a quantum receiver 113. In some variations, the quantum transmitter 111 may include a source of the photons, or a qubit generator. In the quantum communication network, the quantum transmitter can be capable of encoding information on photons. The quantum states can be transported in single qubits/photons or encoded in multiple qubits/photons. The quantum receiver 113 can be capable of decoding this information. Either discrete variable (DV) or continuous variable (CV) quantum information can be encoded.

In some variations, when one node 101A or 101G is connected to two other nodes, the node 101A or 101G has a quantum communication unit 103 at each end of the connection to the two other nodes. Thus, every node may have a number of quantum communication units 103 that equals to the number of connections at the node.

The nodes (e.g. 101B, 101C, 101D, 101E, 101F) may also include a bell-state measurement (BSM) station 109 for performing BSM operation. The BSM station 109 is in a communication with the processor 105 and also in a communication with the quantum memory 107. The Bell states are four specific two-qubit states, also referred to as four maximally entangled two-qubit Bell states, which form a maximally entangled basis, known as the Bell basis. Using a quantomechanical notation, the Bell states are identified as follows:

$$|\Phi^+\rangle = \frac{1}{\sqrt{2}}(|0\rangle_A \otimes |0\rangle_B + |1\rangle_A \otimes |1\rangle_B)$$

$$|\Phi^-\rangle = \frac{1}{\sqrt{2}}(|0\rangle_A \otimes |0\rangle_B - |1\rangle_A \otimes |1\rangle_B)$$

$$|\Psi^+\rangle = \frac{1}{\sqrt{2}}(|0\rangle_A \otimes |1\rangle_B + |1\rangle_A \otimes |0\rangle_B)$$

$$|\Psi^-\rangle = \frac{1}{\sqrt{2}}(|0\rangle_A \otimes |1\rangle_B - |1\rangle_A \otimes |0\rangle_B)$$

In the Bell states, the qubit is an equal coherent superposition of basis states. An important distinguishing feature between qubits and classical bits is that multiple qubits can exhibit quantum entanglement.

Quantum teleportation is a technique for transferring quantum information from a sender or a source node 101A at one location to a receiver or a destination node 101G at a remote location. The quantum communication path is created by implementing entanglement swapping in each node of the network along a path in order to offer to two end points an entangled pair of parties to implement teleporting. Both the entanglement swapping and the teleporting are implemented by executing a BSM operation plus a local operation (e.g. unitary operation) based on the BSM's outcome and communication via a classical channel on the other qubit. The BSM operation is performed between two qubits. In case of entanglement swapping, the two qubits are part of two different entanglement pairs of particles. In case of teleporting, one qubit is part of an entanglement pair and the other qubit is the one to teleport. After completing quantum swapping, which extends a distance of the first quantum communication path using entanglement swapping repeaters from the source node to the destination node, teleporting transfers quantum information based upon the entangled pair of particles in the source node and the destination node.

Figure 2C:
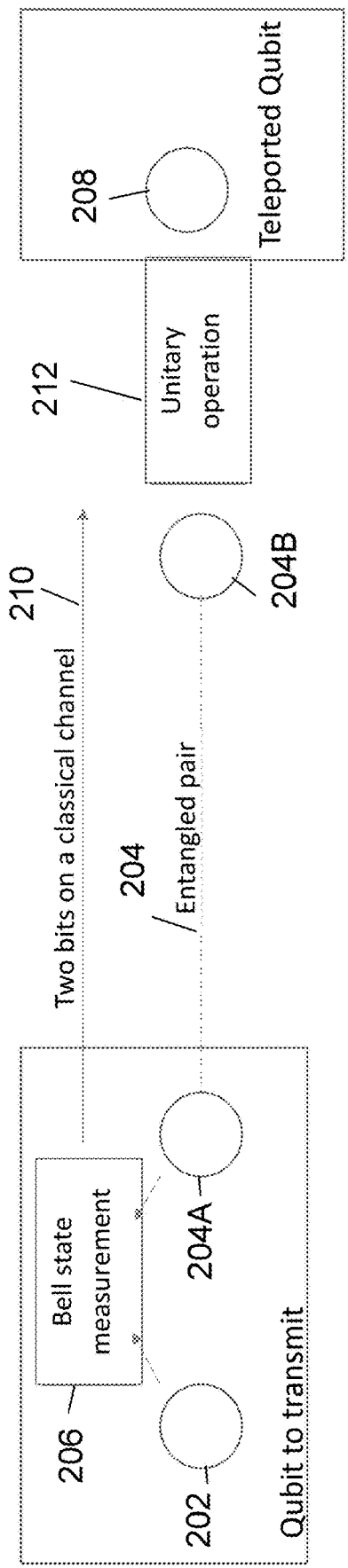
FIG. 2C illustrates a transmission of a BSM result via 2 bits on a classical channel, in accordance with some aspects of the disclosed technology.
Figure 2D:
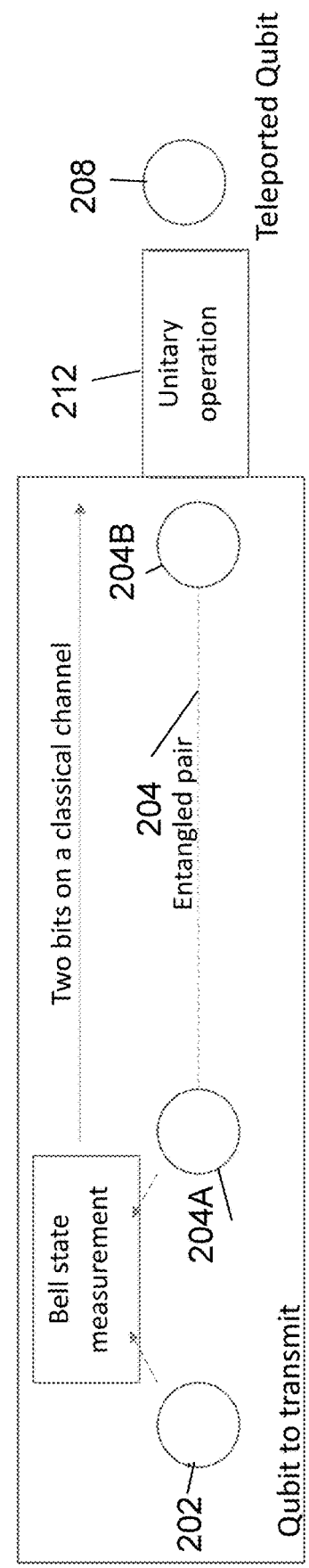
FIG. 2D illustrates performing an unitary operation defined by the BSM result to recover a teleported qubit, in accordance with some aspects of the disclosed technology.

The steps used for quantum teleporting of a quantum state via a Bell state entangled pair are illustrated in FIGS. 2A-2D. As shown in FIG. 2A, a qubit to transmit 202 and a two Bell state entangled pair 204 of particles are illustrated before teleporting. As shown in FIG. 2B, a BSM operation 206 is performed between the qubit to transmit 202 and one particle 204A of an entangled pair, which includes particle 204A and particle 204B, corresponding to two bits in a classical channel 210. As shown in FIG. 2C, teleporting occurs through a Bell state entangled pair 204 to have a transmission of the BSM result via 2 bits on a classical channel 210. As shown in FIG. 2D, a unitary operation 212 defined by the BSM result is performed to recover a teleported qubit 208.

Similarly, FIGS. 3A-3C show how an entanglement swapping extends the distance between entangled particles (e.g. photons), thus enabling teleportation and communication across multiple hops from one node to another node.

FIG. 3A illustrates an entanglement swapping starting from multiple pairs of entangled particles, in accordance with some aspects of the disclosed technology. As shown in FIG. 3A, the transmitters 112 of the communication units 103 create a first entangled pair A of particles, a second entangled pair B of particles, and a third entangled pair C of particles. One of the first entangled pair A of particles 301A is at a first end point 302A which is a quantum node. Also, one of the first entangled pair A of particles 301B and one of the second entangled pair B of particles 301C are at a first quantum node 302B. Also, one of the second entangled pair B of particles 301D and one of the third entangled pair C of particles 301E are at a second quantum node 302C. Further, one of the third entangled pair of particles 301F is at a second end point 302D which is also a quantum node at a remote location from the first end point 302A.

FIG. 3B illustrates that the entanglement swapping is performed via a BSM on particles in the same node of two different entangled pair previously created, in accordance with some aspects of the disclosed technology. As shown in FIG. 3B, the BSM station 109 may execute a first bell state measurement (BSM) operation 304A on one of the first entangled pair A of particles and one of the second entangled pair B of particles at the first quantum node 302B.

The teleporting may include routing the quantum communication path by using the controller 108, and performing entanglement swapping to form a fourth entangled pair D of particles that links the first end point 302A to the second quantum node 302C, as shown in FIG. 3B.

FIG. 3C illustrates that teleporting can be achieved by multiple entanglement swapping to form an end-to-end entangled pair, in accordance with some aspects of the disclosed technology. The BSM station 109 may also execute a second BSM operation 304B on one of the third entangled pair C of particles and one of the second entangled pair B of particles at the second quantum node 302C, as shown in FIG. 3C. All the entanglement swapping needs to be completed before teleporting. However, all the entanglement swapping does not need to be performed simultaneously or in sequence. One or more quantum links that combine to yield a quantum communication path through the quantum mesh network can be built or combined in any order or sequence. The teleporting may include routing the quantum communication path or entanglement swapping path by using the controller, and performing entanglement swapping to form a fifth entangled pair E of particles that links the first end point 302A to the second end point 302D, as shown in FIG. 3C.

Figure 4:
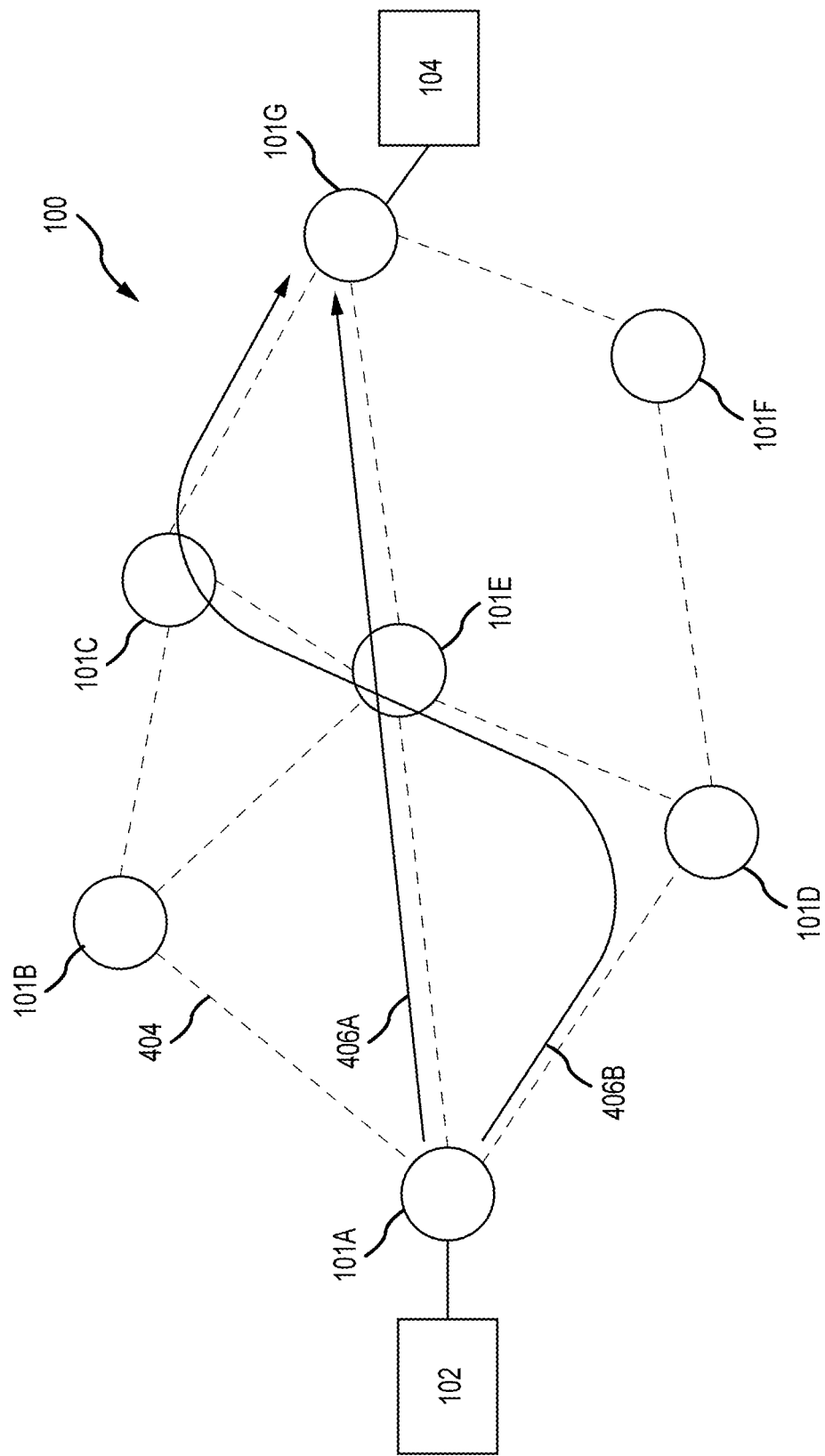
FIG. 4 illustrates a mesh quantum network with multiple entangled swapping paths from one end point to reach the same destination or another end point, in accordance with some aspects of the disclosed technology.

FIG. 4 illustrates a mesh quantum network with multiple entangled swapping paths from one end point to reach the same destination or another end point, in accordance with some aspects of the disclosed technology. As shown, a mesh quantum network 400 includes a plurality of quantum nodes 101A-G, and links 404 connecting the plurality of quantum nodes 101A-G. For example, the link 404 connects two neighboring nodes, e.g. nodes 101A and 101B. Each quantum node may include a processor 105 in a communication with the controller 108. The network 400 may include different paths 406A and 406B between first and second end points 101A and 101G. One of the quantum nodes acts as the first end point 101A or source node. Another quantum node acts as the second end point 101G or destination node. A shorter path 406A hops from node 101A to node 101E and then to node 101G, and includes two links 404. A longer path 406B hops from node 101A to node 101D, then hops to node 101E, then to node 101C, and finally hops to node 101G. The longer path includes four links 404.

In some variations, one or more quantum nodes may be repeaters.

In some variations, the particles may include photons. The quantum channel may include an optical fiber cable transmitting qubits carried by the photons.

Figure 5:
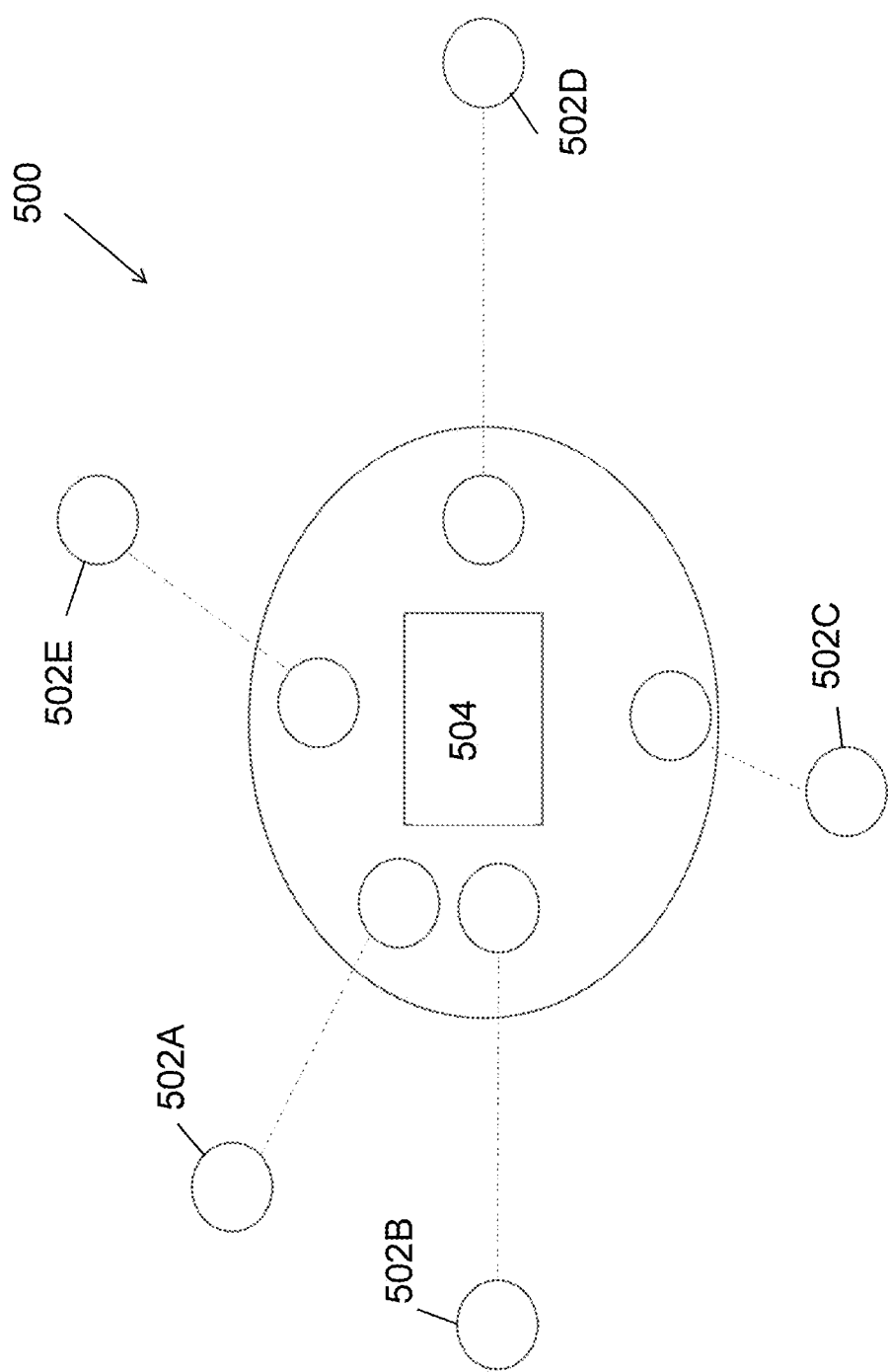
FIG. 5 illustrates that an entanglement swapping path can be selected by performing a BSM operation between each of entangled pairs to identify an appropriate entanglement swapping path, in accordance with some aspects of the disclosed technology.

FIG. 5 illustrates that an entanglement swapping path can be selected by performing a BSM operation between each of entangled pairs to identify an appropriate entanglement swapping path, in accordance with some aspects of the disclosed technology. As shown in FIG. 5, there are five entangled pairs 502A-E with one of each of five entangled pairs in a node 506. A BSM matrix 504 includes BSM operations for each of the entangled pairs 502A-E for the node 506. The BSM operations can be performed on the five entangled pairs to determine which pair becomes the appropriate entanglement swapping path that includes the node 506. For example, the node 506 may represent node 101E as shown in FIG. 4, which may have five entangled pairs to nodes 101A, 101B, 101C, 101D, and 101G as shown in FIG. 4. Note that not all nodes in the network can be entangled, such as node 101F. The node 502B may represent a source node 101A which connects to one party, e.g. Alice. The node 502D may represent a destination node which connects to another party, e.g. Bob.

Independently of the technology implemented to generate the Bell state entangled pair suitable for entanglement swapping and teleporting, the quantum state needs to be stored into a quantum memory. It is well known that storing the quantum state is a very sensitive operation, because the quantum state may change over time due to the quantum memory's interaction with the environment. Such a phenomena is called decoherence. The quantum memory has a decoherence time, which is also referred to as a coherence decay time.

Four parameters are normally used to describe quantum links and quantum repeaters, including generation rate of Bell state, multiplexing or storing capacity, fidelity, and lifetime or decoherence time. While the generation rate and storing capacity may be similar to the bandwidth capacity of a classical channel, there is no equivalent for fidelity and lifetime. The fidelity is a parameter that characterizes quality of the entangled pairs offered for the communication. The fidelity drops with time according to the decoherence time that is characteristic of the specific quantum memory technology. The fidelity also drops similarly with the number of quantum operations, including entanglement swapping, as a function of quantum gate technology. The fidelity may be improved consuming multiple parallel entangled Bell states on the same link. Such an operation is known as entanglement purification.

Two important parameters, i.e. fidelity (dropping with the coherence time), and entanglement generation rate, are identified to build an appropriate protocol that implements the routing of the quantum channel in the mesh quantum network. The entanglement generation rate is also referred to the generation rate, an entanglement consumption rate, a quantum channel rate, or an entangled bandwidth in the disclosure.

Two quantum computers at two remote end points can communicate through a quantum channel, which would require to determine a minimum entanglement consumption rate $1/T_c$ (qubit/sec) or entangled bandwidth and a minimum acceptable fidelity $F_m$ for a specific quantum computing application. The entanglement consumption rate can be assimilated to a transfer bandwidth.

Given as described above, it is now clear that the most appropriate path across the mesh quantum network is not simply associated with the number of hops or the length of the path. The selection of the appropriate path needs to be weighted with the technology used in each quantum node of the quantum network in order to deliver necessary quantum channel rate with the appropriate fidelity and coherence time or lifetime for each quantum computing application.

The disclosure provides a routing protocol or algorithm to select a path across a mesh quantum network based upon the fidelity and coherence time or lifetime. In an analogue way, the path across the mesh quantum network may have an entanglement generation rate $1/T_p$ (i.e. entangled bandwidth), and a path fidelity $F_p(t)$ with a fidelity time constant $T_F$ that characterizes a fidelity evolution over time, where $F_p(t)=F_p e^{-t/T_F}$, where $F_p$ is an initial constant for the fidelity. Alternative functions can also be used to characterize the fidelity evolution over time. To support a specific quantum computing application, the following Equations (1) and (2) need to be satisfied:

$$1/T_p > 1/T_c \quad \text{Equation (1)}$$

and $$F_m < F_p(T_c) = F_p e^{-T_c/T_F} \quad \text{Equation (2)}$$

where $F_m$ is a minimum path fidelity and $1/T_c$ is a minimum entanglement generation rate for a quantum computing application.

The routing protocol can either work in a centralized approach or in a distributed approach. However, in order to implement an appropriate routing protocol, one needs to be aware of the specific constraints posed by the quantum technology behind the quantum communication.

Figure 6:
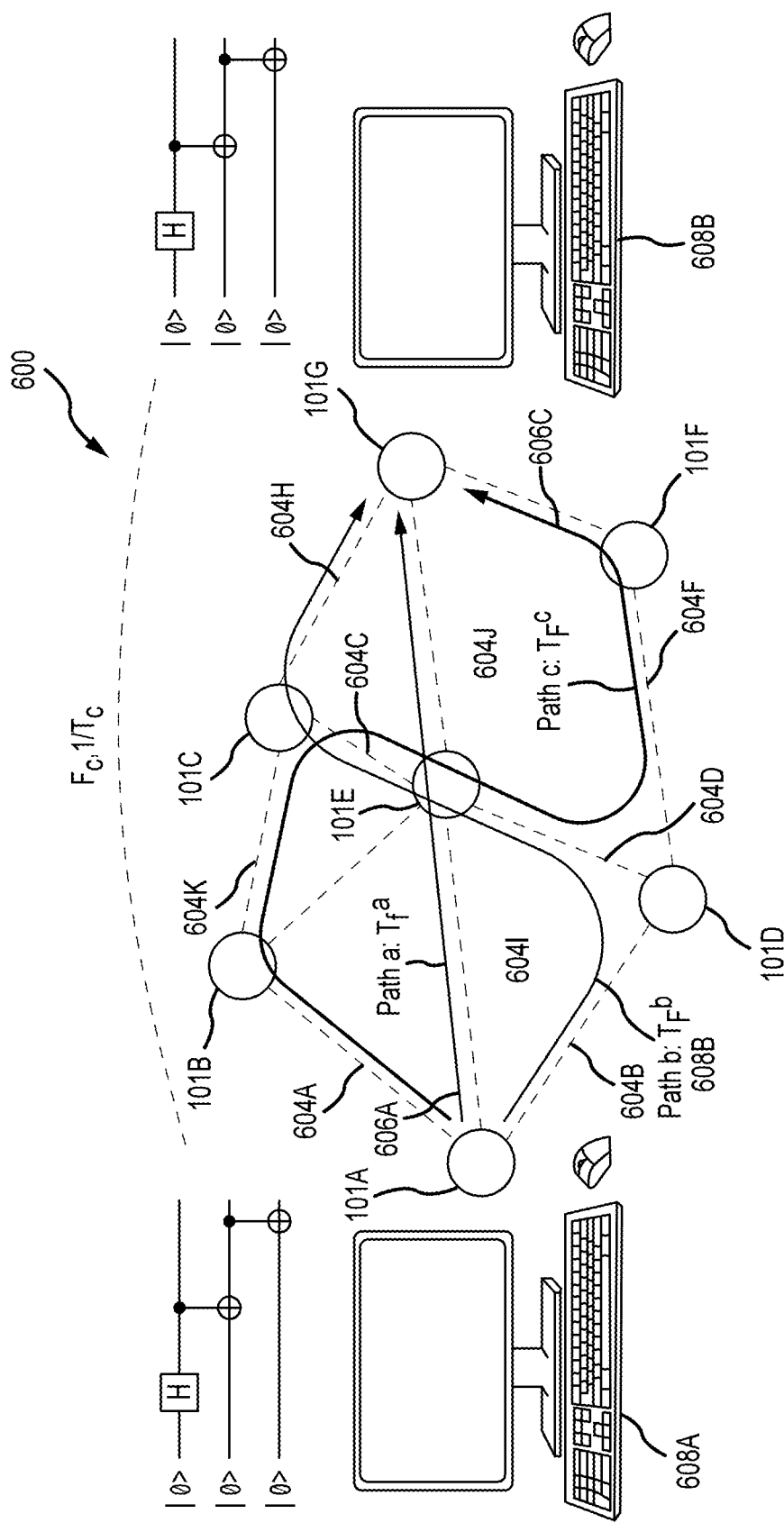
FIG. 6 illustrates selecting a path across a mesh quantum network, in accordance with some aspects of the disclosed technology.

FIG. 6 illustrates selecting an appropriate routing path across a mesh quantum network, in accordance with some aspects of the disclosed technology. As illustrated, a quantum network 600 includes a plurality of quantum nodes 101A-101G, connected by links 604A-J between two neighboring nodes. For example, link 604A connects quantum nodes 101A and 101B. Quantum node 101A is in a communication with an end user 608A at one end point or an end node. Quantum node 101G is in a communication with another end user 608G at another end point or another end note. The communication may be telecommunication using visible or microwaves. In contrast, quantum communication may go through photons.

The network 600 has a minimum fidelity Fm and a minimum entanglement generation rate $1/T_c$ for a specific quantum computing application. As an example, three possible paths 606A-606C are illustrated. A first path 606A includes two links 604I and 604J. A second path 606B includes four links 604B, 604D, 604C, and 604H. A third path 606C includes six links 604A, 604K, 604C, 604D, 604F, and 604G.

The path 606A has a path generation rate $1/T_F^a$, and a path fidelity $F_p^a$. Each link of the path 606A has a generation rate $1/T_F^{a1}$, a fidelity $F_p^{a1}$, $1/T_F^{a2}$, $F_p^{a2}$, $1/T_F^{a3}$, $F_p^{a3}$ . . . . Likewise, the path 606B has a path generation rate $1/T_F^b$, and a path fidelity $F_p^b$. Each link of the path 606B has a generation rate $1/T_F^{b1}$, a fidelity $F_p^{b1}$, $1/T_F^{b2}$, $F_p^{b2}$, $1/T_F^{b3}$, $F_p^{b3}$ . . . . The path 606C has a path generation rate $1/T_F^c$, and a path fidelity $F_p^c$. Each link of the path 606C has a generation rate $1/T_F^{c1}$, a fidelity $F_p^{c1}$, $1/T_F^{c2}$, $F_p^{c2}$, $1/T_F^{c3}$, $F_p^{c3}$ . . . where the numbers 1, 2, 3 represents link 1, link 2, and link 3, respectively.

Each link or path can handle fidelity and entanglement generation rate as an ensemble of multiple solutions ($F_{p1}$, $1/T_{p1}$; $F_{p2}$, $1/T_{p2}$; $F_{p3}$, $1/T_{p3}$; . . . ), where the numbers 1, 2, and 3 represent path 1, path 2, path 3, respectively.

The quantum path may be selected based upon the fidelity $F_p(t)=F_p e^{-t/T_F}$ greater than the minimum $F_m$ for a quantum computing application, wherein $F_p$ is an initial fidelity, and $T_F$ is a fidelity time constant, and also based upon an entanglement generation rate $1/T_p$ greater than $1/T_c$. The generation rate and the fidelity of the selected quantum path must satisfy Equations (1) and (2). As an example, all the links of the path 606B may satisfy Equations (1) and (2), while not all the links of the path 606A or 606C satisfy Equations (1) and (2). As such, the path 606B may be selected as the routing path or communication path from the end user 608A to the other end user 608G. The links of the path 606B are used to ultimately position a pair of entanglement particles with one particle at a source node and the other particle of the entangled pair at the destination node. The entanglement of the link is an intermediate state. When entanglement swapping is performed, the entanglement between the initial pair of particles is consumed (or destroyed) and the entanglement status transferred to a different pair of particles. This process can across multiple links in a path until the respective particles of a pair of entangled particles are properly positioned.

Calculation of the parameters for each path has some complexities, because the calculation needs to combine similar information for each quantum link of the quantum network (e.g. entanglement generation rate, and fidelity), with the quantum memory coherence time of each node, with the latency to transfer classical information on each quantum link and across the path. Also, the path fidelity is affected by the fidelity of each Bell state entangled pair and also by gate operations including entanglement swapping. A higher fidelity can also be achieved using the purification procedure at link, multi-link or on the entire path, sacrificing the entanglement generation rate for each Bell state entangled pair across the quantum network. For example, reducing the entanglement generation rate may increase the fidelity. The calculation of the entanglement generation rate and the fidelity may use known iteration methods.

The latency for a classical communication across multiple links from end to end, as in entanglement swapping or purification cases, may be lower than the sum of the latency of each link, because the classical communication can use a shorter path across the network.

A database including parameters (e.g. $F_{p1}$, $1/T_{p1}$; $F_{p2}$, $1/T_{p2}$; $F_{p3}$, $1/T_{p3}$; . . . ) and/or ($1/T_F^{a1}$, $F_p^{a1}$, $1/T_F^{a2}$, $F_p^{a2}$, $1/T_F^{a3}$, $F_p^{a3}$) needs to be continuously updated, because updated parameters can be affected by other quantum applications running across the same network. Different from the classical network, but similar to traffic engineered networks, the database accounts for all the entangled bandwidths or entanglement consumption rates of all the active applications or all the running applications.

Each of the plurality of quantum nodes has a respective fidelity and a respective coherence decay time in the mesh quantum network. The parameters including fidelity and generation rate are analyzed for each node in the database to yield a determination of a path fidelity with a path coherence decay time and a path generation rate.

In some variations, a quantum communication path may be selected from a source node to a destination node based upon the path fidelity $F_p(t)=F_p e^{-t/T_F}$ greater than the minimum fidelity $F_m$ for the quantum computing application and the entanglement generation rate $1/T_p$ greater than the minimum entanglement generation rate $1/T_c$.

In some variations, the quantum communication path can be routed through the first quantum link from the first quantum node to the second quantum node by using the controller, and then routed through the second quantum link from the second quantum node to the third quantum node by using the controller.

In some variations, a quantum communication path may be selected based upon a highest margin of the path fidelity for a quantum communication path.

In some variations, a quantum communication path may be selected based upon a lowest margin of the path fidelity for a quantum communication path.

In some variations, a quantum communication path may be selected based upon a highest margin of the entanglement generation rate for a quantum communication path.

In some variations, a quantum communication path may be selected based upon a lowest margin of the entanglement generation rate for a quantum communication path.

In some variations, the protocol may maximize margins in the entanglement generation rate and/or the path fidelity to identify an appropriate path between two end points to guarantee the operations of a specific quantum computing application.

In some variations, the protocol may minimize margins in the entanglement generation rate and/or the path fidelity to identify an appropriate path between two end points to guarantee the operations of a specific quantum computing application.

In some variations, the protocol may maximize one margin in the entanglement generation rate (or the path fidelity) and minimize another margin in the path fidelity (or the entanglement generation rate) to identify an appropriate path between two end points to guarantee the operations of a specific quantum computing application.

In some variations, the routing protocol for selection of the path can be a distributed one that builds the path by hops from one node to another node.

In some variations, the routing protocol can also be a centralized one that runs in a personal consumption expenditure (PCE) link application that collects information from each node of the network.

In some aspects, the entanglement generation rate can split across multiple quantum paths, i.e. a total entanglement consumption rate or a total entangled bandwidth can be split across multiple paths adopting strategy 1 or 2 for the selection of each path.

Figure 7:
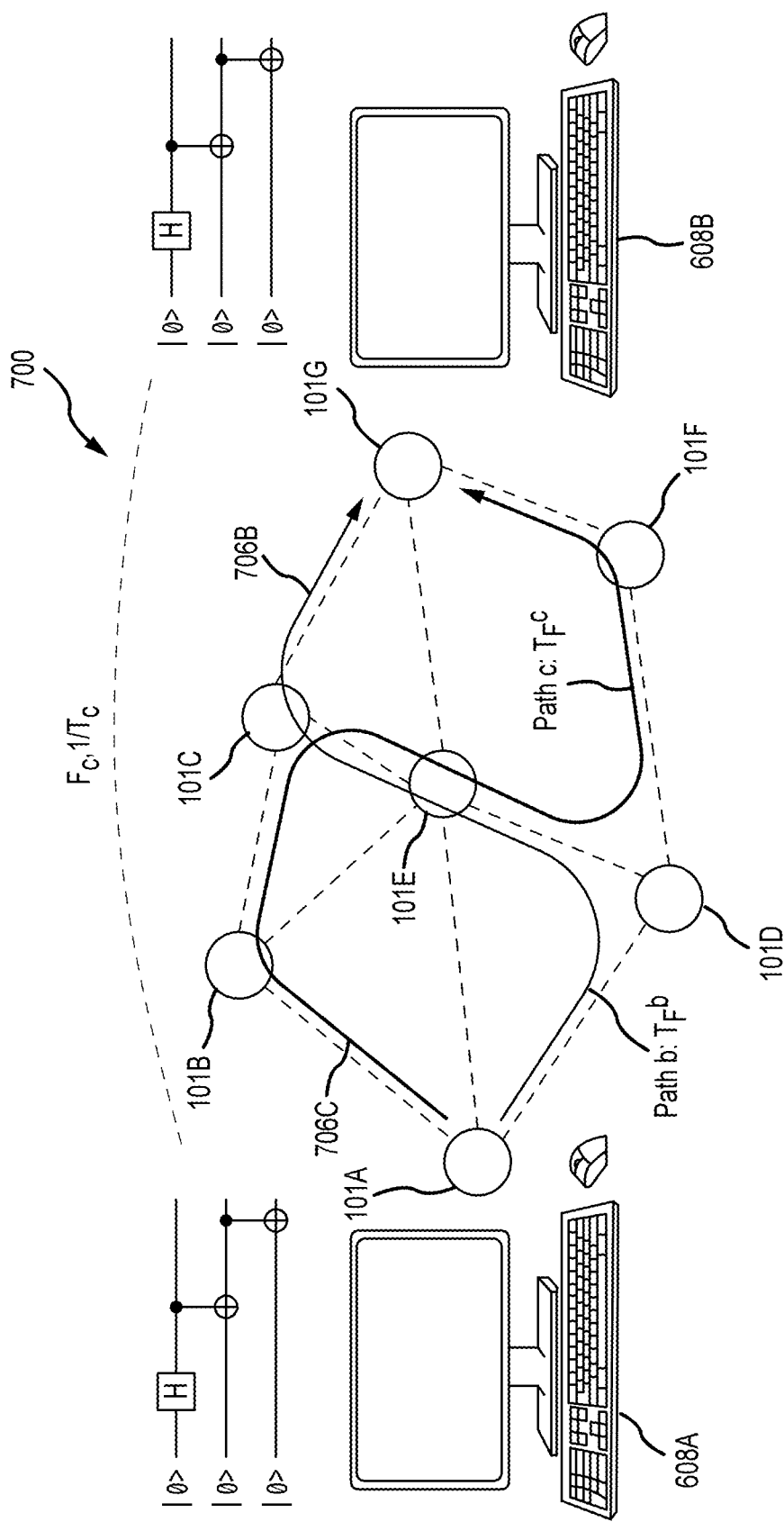
FIG. 7 illustrates splitting a quantum path across a mesh quantum network, in accordance with some aspects of the disclosed technology.

FIG. 7 illustrates splitting a quantum path across a mesh quantum network, in accordance with some aspects of the disclosed technology. As shown in FIG. 7, a network 700 may include a plurality of quantum nodes 101A-101G, which are connected by links 704A-J between two neighboring nodes. The network 700 includes two paths, i.e. Path 706b and Path 706c. The quantum split path rules are provided in Equations (3) and (4):

$$1/T_c < 1/T_p^b + 1/T_p^c \quad \text{Equation (3)}$$

$$F_m < F_p^b(T_c), F_p^c(T_c) \quad \text{Equation (4)}$$

where $T_F^b$, $F_p^b$, $1/T_p^b$ are an initial time constant, a fidelity, and an entanglement generation rate for Path 706b respectively, while $T_F^c$, $F_p^c$, $1/T_p^c$ are an initial time constant, a fidelity, and an entanglement generation rate for Path 706c, respectively. As shown in Equation (3), the sum of the entanglement generation rate of the Path 706b and Path 706c is greater than $1/T_c$. The fidelity $F_p^b(T_c)$ and $F_p^c(T_c)$ of each of Path 706b and Path 706c is greater than $F_m$.

The network 700 can select quantum links of the quantum communication path (e.g. Path 706b and Path 706c) from a first end point 101A to a second end point 101G based upon the path fidelity $F_p(t)$ of the first quantum communication path (e.g. Path 706b) and the path fidelity $F_p(t)$ of the second quantum communication path (e.g. Path 706c) greater than the minimum $F_m$ for the quantum computing application and a combined entanglement generation rate $1/T_p$ of the first quantum communication path (e.g. Path 706b) and the second quantum communication path (e.g. Path 706c) greater than $1/T_c$. The second quantum communication path (Path 706c) has a same end point as the first quantum communication path (Path 706b).

Figure 8:
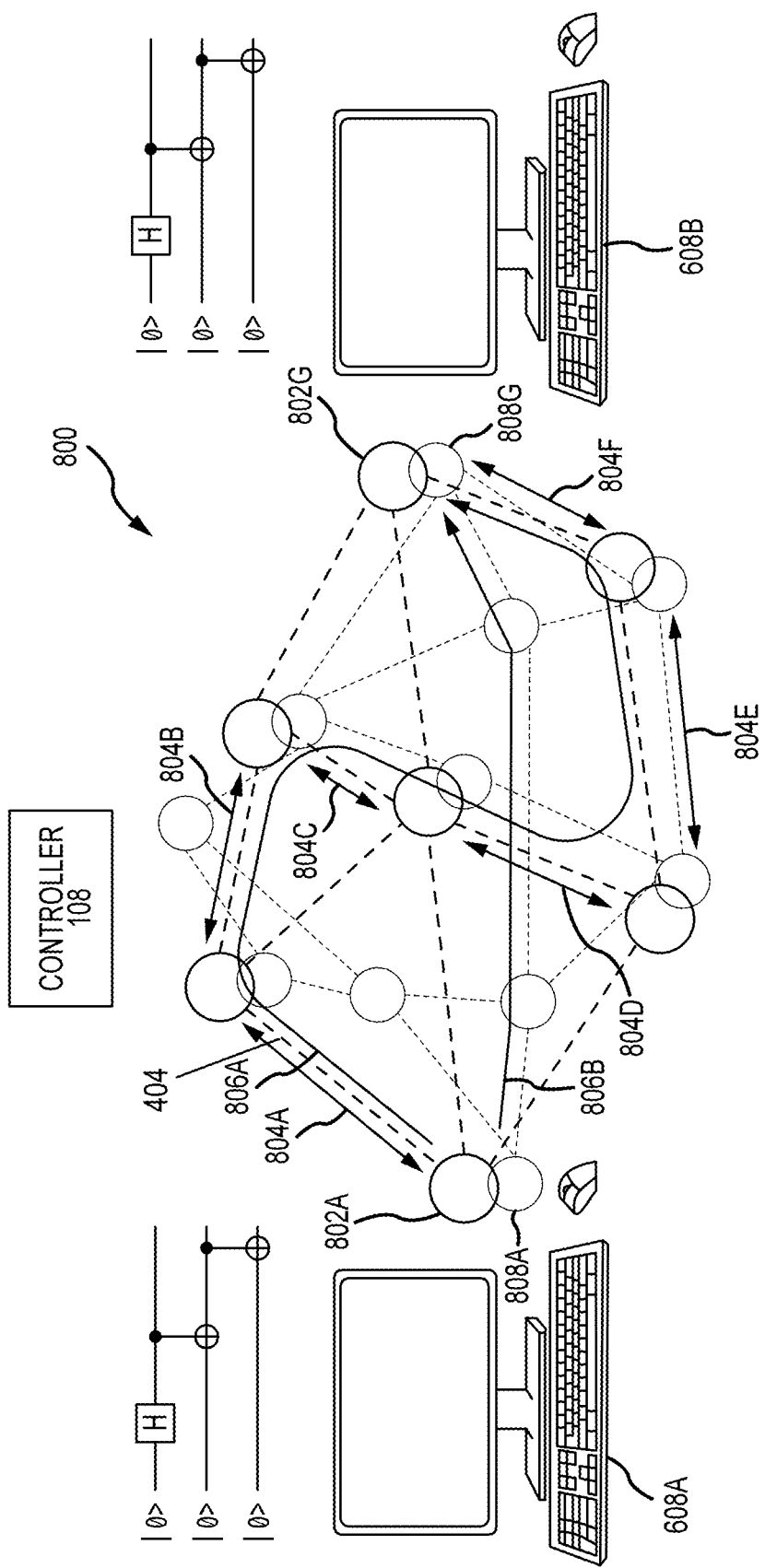
FIG. 8 illustrates a combination of a classical communication path and a quantum communication path, in accordance with some aspects of the disclosed technology.

FIG. 8 illustrates a combination of a classical communication path and a quantum communication path, in accordance with some aspects of the disclosed technology. A network 800 includes a plurality of quantum nodes 802A-G and a plurality of links or quantum channels 404 (illustrated in dash lines) that connect the plurality of quantum nodes 802A-G. Note that a quantum communication path or quantum entanglement swapping path 806A is illustrated from a source quantum node 802A to a destination quantum node 802G. Each of quantum nodes 802A-G includes a processor 105 and a quantum memory device 107. The processor 105 of each of nodes 802A-G is in a communication with a controller 108. The quantum communication path or quantum entanglement swapping path 806A includes multiple quantum links or quantum channels 404.

The network 800 also includes a plurality of classical nodes 808A-G and a plurality of classical links 804A-F (illustrated in solid lines with arrows) that connect the plurality of classical nodes 808A-G. Note that a classical communication path 806B is illustrated from a source classical node 808A to a destination classical node 808G. The plurality of classical nodes are located at respective locations of the plurality of quantum nodes 802A-G. Each of classical nodes 808A-G includes a processor and a memory device. The processor of each of classical nodes 808A-G is also in a communication with the controller 108. The controller 108 may include one or more processors that are configured to execute a routing algorithm method for the quantum communication path across the network 800 including the quantum nodes and classical nodes. The controller 108 may include a memory device. The routing algorithm are instructions that can be stored in the memory device and executed by the processors. The routing method for the classical path is a traditional network method.

Figure 9:
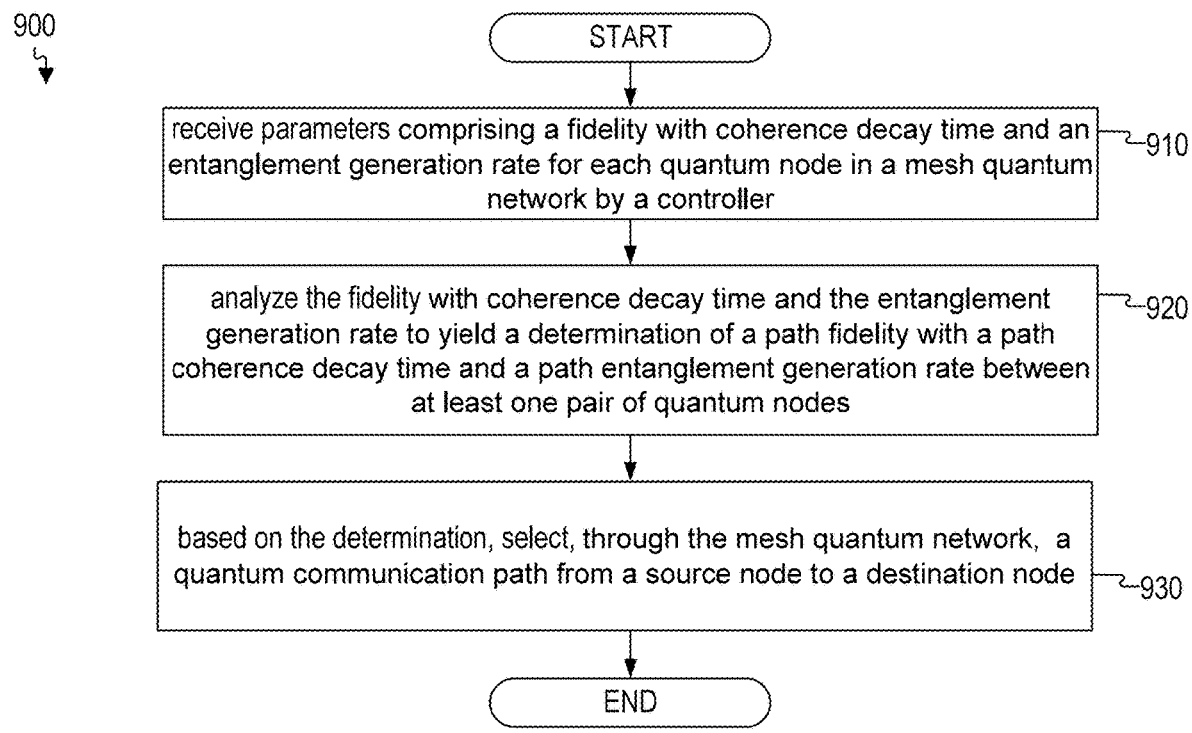
FIG. 9 is a flow chart illustrating steps for selecting a routing path in a quantum network, in accordance with some aspects of the disclosed technology.

FIG. 9 is a flow chart illustrating steps for selecting a routing path in a quantum network, in accordance with some aspects of the disclosed technology. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method 900 includes receiving parameters including fidelity with coherence decay time and an entanglement generation rate for each quantum node in a mesh quantum network by a controller, the controller being configured to communicate with each quantum node of a plurality of quantum nodes in the mesh quantum network, each quantum node including a quantum memory and a processor at block 910. In some embodiments, the processor is a classical processor. For example, the controller 108 illustrated in FIG. 1A may receive parameters including fidelity with coherence decay time and an entanglement generation rate for each quantum node in a mesh quantum network by a controller, the controller be configured to communicate with each quantum node of a plurality of quantum nodes in the mesh quantum network, each quantum node including a quantum memory and a processor.

According to some examples, the method includes analyzing the fidelity with coherence decay time and the entanglement generation rate between at least one pair of quantum nodes to yield a determination of a path fidelity with a path coherence decay time and a path entanglement generation rate at block 920. For example, the controller 108 illustrated in FIG. 1A may analyze the fidelity with coherence decay time and the entanglement generation rate between at least one pair of quantum nodes to yield a determination of a path fidelity with a path coherence decay time and a path entanglement generation rate.

According to some examples, the method includes based on the determination, selecting, through the mesh quantum network, a quantum communication path from a first end point or a source node to a second end point or a destination node at block 930. For example, the controller 108 illustrated in FIG. 1A may select, through the mesh quantum network, a quantum communication path from a first end point or a source node to a second end point or a destination node, based on the determination.

Figure 10:
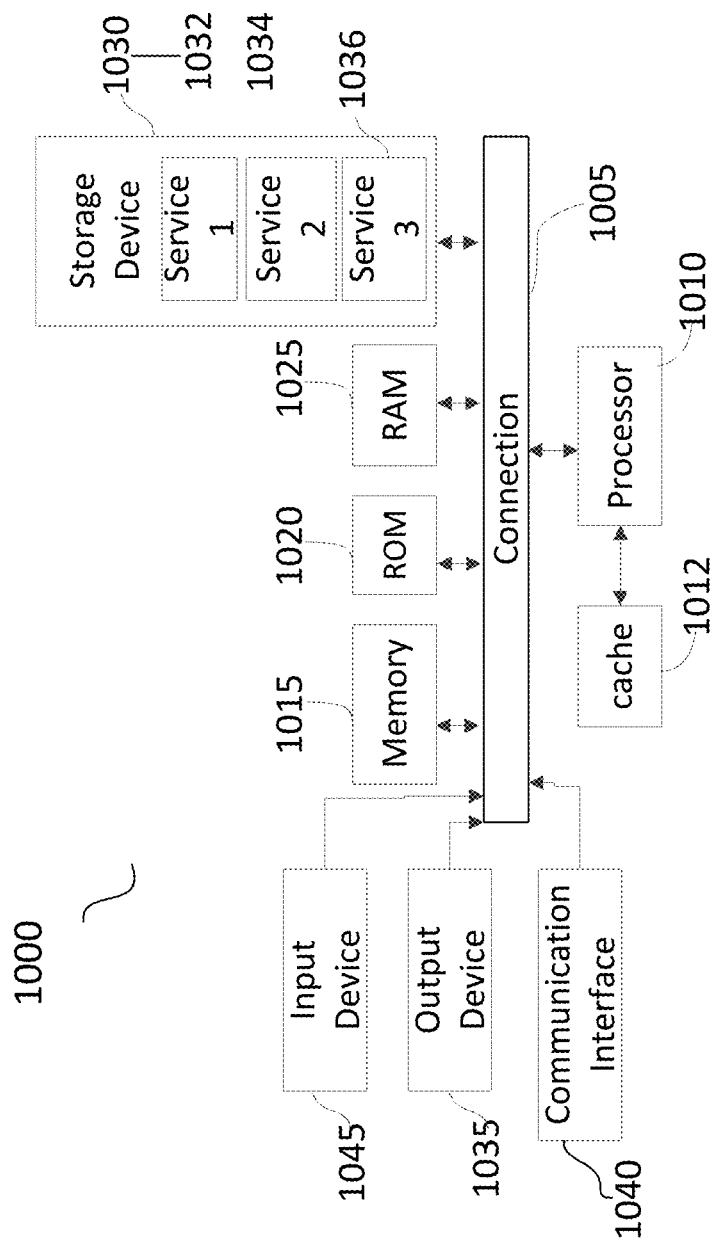
FIG. 10 shows an example of computing system, in accordance with some aspects of the disclosed technology.

FIG. 10 shows an example of computing system 1000, which can be for example any computing device making up the controller 108, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A method comprising:
receiving parameters comprising a fidelity with coherence decay time and an entanglement generation rate in a mesh quantum network by a controller, the mesh quantum network including at least an interconnection of quantum processors that generate, exchange, and process quantum information;
analyzing the fidelity with coherence decay time and the entanglement generation rate to yield a determination of a path fidelity with a path coherence decay time and a path entanglement generation rate of a plurality of quantum links in the mesh quantum network; and
based on the determination, selecting, through the mesh quantum network, a first quantum communication path including at least one quantum link of the plurality of quantum links based upon a path fidelity of the first quantum communication path being greater than a minimum path fidelity for a quantum computing application,
wherein the path fidelity is a function of time equal to an exponential decay formula using an initial fidelity and fidelity time constant.

2. The method of claim 1, wherein the determination comprises the minimum path fidelity $F_m$ and a minimum entanglement generation rate $1/T_c$ for the quantum computing application.

3. The method of claim 2, wherein selecting the first quantum communication path is based upon the path fidelity $F_p(t)=F_p e^{-t/T_F}$ of the first quantum communication path being greater than the minimum path fidelity $F_m$ for the quantum computing application, wherein $F_p$ is the initial fidelity, and $T_F$ is the fidelity time constant.

4. The method of claim 3, wherein the selecting the first quantum communication path is based upon a path entanglement generation rate $1/T_p$ greater than $1/T_c$.

5. The method of claim 3, wherein the selecting the first communication path further comprises selecting a second quantum communication path including at least a second quantum link of the plurality of quantum links based upon the path fidelity $F_p(t)$ of the first quantum communication path and a second path fidelity $F_p(t)$ of the second quantum communication path being greater than the minimum path fidelity $F_m$ for the quantum computing application and a combined entanglement generation rate $1/T_p$ of the first quantum communication path and the second quantum communication path being greater than $1/T_c$.

6. The method of claim 5, wherein the second quantum communication path has a same end point as the first quantum communication path.

7. The method of claim 1, further comprising teleporting by transferring a qubit is based upon a pair of entangled particles, in which a first entangled particle of the pair of entangled particles is at a source and a second entangled particle of the pair of entangled particles is at a destination, after completing quantum swapping that extends a distance between the first entangled particle and the second entangled particle using entanglement swapping repeaters from the source to the destination.

8. The method of claim 1, wherein the selecting the first quantum communication path is based upon a highest margin of the fidelity for a quantum communication path.

9. The method of claim 1, wherein the selecting the first quantum communication path is based upon a lowest margin of the fidelity for a quantum communication path.

10. The method of claim 1, wherein the selecting the first quantum communication path is based upon a highest margin of the entanglement generation rate for a quantum communication path.

11. The method of claim 1, wherein the selecting the first quantum communication path is based upon a lowest margin of the entanglement generation rate for a quantum communication path.

12. The method of claim 1, wherein each quantum link comprises one particle of a first pair of entangled particles at a source and one particle of a second pair of entangled particles at a destination.

13. A system comprising:
one or more processors; and a non-transitory computer readable medium comprising instructions stored therein, the instructions, when executed by the one or more processors, cause the system to perform operations comprising:

receiving parameters comprising a fidelity with coherence decay time and an entanglement generation rate in a mesh quantum network by a controller, the mesh quantum network including at least an interconnection of quantum processors that generate, exchange, and process quantum information;

analyzing the fidelity with coherence decay time and the entanglement generation rate to yield a determination of a path fidelity with a path coherence decay time and a path entanglement generation rate of a plurality of quantum links in the mesh quantum network; and based on the determination, selecting, through the mesh quantum network, a first quantum communication path including at least one quantum link of the plurality of quantum links based upon a path fidelity of the first quantum communication path being greater than a minimum path fidelity for a quantum computing application, wherein the path fidelity is a function of time equal to an exponential decay formula using an initial fidelity and fidelity time constant.

14. The system of claim 13, wherein the determination comprises the minimum path fidelity $F_m$ and a minimum entanglement generation rate $1/T_c$ for the quantum computing application.

15. The system of claim 13, wherein the selecting the first quantum communication path is based upon either a highest margin of the fidelity for a quantum communication path or a lowest margin of the fidelity for a quantum communication path.

16. The system of claim 13, wherein the selecting the first quantum communication path is based upon either a highest margin of the entanglement generation rate for a quantum communication path or a lowest margin of the entanglement generation rate for a quantum communication path.

17. The system of claim 13, wherein each quantum link comprises one particle of a first pair of entangled particles at a source and one particle of a second pair of entangled particles at a destination.

18. A non-transitory computer readable medium comprising instructions, the instructions, when executed by a system, cause the system to perform operations comprising:

receiving parameters comprising a fidelity with coherence decay time and an entanglement generation rate in a mesh quantum network by a controller, the mesh quantum network including at least an interconnection of quantum processors that generate, exchange, and process quantum information;

analyzing the fidelity with coherence decay time and the entanglement generation rate to yield a determination of a path fidelity with a path coherence decay time and a path entanglement generation rate of a plurality of quantum links in the mesh quantum network; and based on the determination, selecting, through the mesh quantum network, a first quantum communication path including at least one quantum link of the plurality of quantum links based upon a path fidelity of the first quantum communication path being greater than a minimum path fidelity for a quantum computing application, wherein the path fidelity is a function of time equal to an exponential decay formula using an initial fidelity and fidelity time constant.

19. The non-transitory computer readable medium of claim 18, wherein the determination comprises the minimum path fidelity $F_m$ and a minimum entanglement generation rate $1/T_c$ for the quantum computing application.

20. The non-transitory computer readable medium of claim 18, wherein the selecting the first quantum communication path is based upon either a highest margin of the fidelity for a quantum communication path or a lowest margin of the fidelity for a quantum communication path.

* * * * *